(12) United States Patent
Wepfer et al.

(10) Patent No.: US 8,670,514 B2
(45) Date of Patent: Mar. 11, 2014

(54) HATCH MECHANICAL LOCKING SYSTEM

(75) Inventors: Robert M. Wepfer, Export, PA (US); Christopher G. Pankiewicz-Nohr, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1074 days.

(21) Appl. No.: 12/254,203

(22) Filed: Oct. 20, 2008

(65) Prior Publication Data

US 2009/0154631 A1  Jun. 18, 2009

Related U.S. Application Data

(60) Provisional application No. 61/013,714, filed on Dec. 14, 2007.

(51) Int. Cl.
*G21C 13/00* (2006.01)

(52) U.S. Cl.
USPC .......................................... 376/205; 376/203

(58) Field of Classification Search
USPC ................... 70/129, 162, 229, 230, 231, 232
See application file for complete search history.

(56) References Cited

U.S. PATENT DOCUMENTS

| | | | | |
|---|---|---|---|---|
| 1,015,424 A * | 1/1912 | Cline | ............................ | 292/178 |
| 1,670,430 A * | 5/1928 | Alexander | .................... | 292/143 |
| 2,966,576 A * | 12/1960 | Nowotny | .................... | 219/60 R |
| 4,398,649 A * | 8/1983 | Labbe | ............................ | 220/327 |
| 4,503,903 A * | 3/1985 | Kramer | ............................ | 165/76 |
| 4,519,519 A * | 5/1985 | Meuschke et al. | ............. | 220/211 |
| 4,583,584 A * | 4/1986 | Wepfer | ............................ | 165/82 |
| 4,632,068 A * | 12/1986 | Appleman et al. | .............. | 122/34 |
| 4,658,611 A * | 4/1987 | Deacon | ............................ | 70/360 |
| 4,690,206 A * | 9/1987 | Bein | ................................ | 165/81 |
| 4,744,392 A * | 5/1988 | Tade et al. | ........................ | 138/89 |
| 5,544,922 A * | 8/1996 | Shumard et al. | ................. | 285/23 |
| 5,785,195 A * | 7/1998 | Zwemer et al. | ................ | 215/329 |
| 6,173,993 B1 * | 1/2001 | Shumard et al. | ................. | 285/23 |
| 6,394,510 B1 * | 5/2002 | Stewart, III | ..................... | 292/288 |
| 7,484,775 B2 * | 2/2009 | Kennedy, Jr. | .................. | 285/337 |
| 2004/0062596 A1 * | 4/2004 | Walworth et al. | ............. | 403/373 |
| 2005/0047854 A1 * | 3/2005 | Walworth et al. | ............. | 403/306 |

* cited by examiner

*Primary Examiner* — Jack W Keith
*Assistant Examiner* — Marshall O'Connor
(74) *Attorney, Agent, or Firm* — Richard J. Coldren; Westinghouse Electric Company LLC

(57) ABSTRACT

A locking mechanism for securing hatches internal to a steam generator that is made up of only mechanical locking elements with fully captured moving parts. The mechanism employs a locking pin with redundant mechanisms to secure the pin in the closed position. The moving parts of the device can be attached directly to a removable hatch so that installation and repairs that may be required can be performed outside of the pressure vessel of the steam generator.

10 Claims, 4 Drawing Sheets

HATCH MECHANICAL LOCKING SYSTEM

CROSS-REFERENCE TO RELATED APPLICATIONS

This application claims priority of Provisional Application Ser. No. 61/013,714, filed Dec. 14, 2007.

BACKGROUND OF THE INVENTION

1. Field of the Invention

This invention relates in general to locking mechanisms and more particularly to an access hatch locking mechanism.

2. Description of the Related Art

A pressurized water reactor nuclear steam generator typically comprises a vertically oriented shell, a plurality of U-shaped tubes disposed in the shell so as to form a tube bundle, a tube sheet for supporting the tubes at the ends opposite the U-like curvature, a dividing plate that cooperates with the tube sheet and a channel head forming a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with the primary fluid outlet header. The steam generator secondary side comprises a wrapper disposed between the tube bundle and the shell to form an annular chamber made up of the shell on the outside and the wrapper on the inside, and a feedwater ring disposed above the U-like curvature end of the tube bundle.

The primary fluid having been heated by circulation through the reactor enters the steam generator through the primary fluid inlet nozzle. From the primary fluid inlet nozzle, the primary fluid is conducted through the primary fluid inlet header, through the U-tube bundle, out the primary fluid outlet header, through the primary fluid outlet nozzle to the remainder of the reactor coolant system. At the same time, feedwater is introduced to the steam generators secondary side through a feedwater nozzle which is connected to a feedwater ring inside the steam generator. Upon entering the steam generator, the feedwater mixes with water returning from steam separators, called the recirculation stream. This mixture, called the downcomer flow, is conducted down the annular chamber adjacent to the shell until the tube sheet near the bottom of the annular chamber causes the water to reverse direction passing in heat transfer relationship with the outside of the U-tubes and up through the inside of the wrapper. While the water is circulating in heat transfer relationship with the tube bundle, heat is transferred from the primary fluid in the tubes to the water surrounding the tubes causing a portion of the water surrounding the tubes to be converted to steam. The steam then rises and is conducted through a number of moisture separators that separate entrained water from the steam, and the steam vapor then exits the steam generator and is typically circulated through electrical generating equipment to generate electricity in a manner well known in the art.

Since the primary fluid contains radioactive materials and is isolated from the feedwater only by the U-tube walls, the U-tube walls form part of the primary boundary for isolating these radioactive materials. It is, therefore, important that the U-tubes be maintained defect-free so that no breaks will occur in the U-tubes that will cause radioactive materials from the primary fluid to enter the secondary side; an undesirable result.

Periodic maintenance is scheduled for the steam generators, typically during a service outage, to inspect the integrity of the U-shaped tubes as well as to inspect the remaining components of the steam generators and clean accumulated loose parts and sludge to insure the continued efficient and safe operation of the steam generators. To perform this maintenance operation manways are provided in the steam generator shell to gain access to the interior of the generators. Typically, manways are provided in the shell above the tube sheet to gain access to the tube lanes and above the lower deck plate, which is supported horizontally above the curvature of the U-shaped tubes to separate the steam drum which extends upward from the lower deck plates from the area surrounding the U-shaped tubes. Riser tubes extend upward from the lower deck plate and communicate the area below the lower deck plate with the area within the steam drum. The riser tubes contains swirl vanes that centrifugally separate out and drain entrained water from the rising steam. The riser tubes form the primary separators which deliver the steam to a secondary set of separators, which are supported above an upper deck plate in the steam drum. Access hatches may be provided in one or more of the deck plates for maintenance access during service outages, that have to be maintained sealed when the steam generators are put back into operation. Typically, the hatches are sealed by welding. That necessitates that when access is required during a maintenance operation, that the welded locking devices be ground off to gain access to the different levels of the steam drum. After the inspections are completed, the locking devices have to be welded back in place. All this grinding and welding adds to site schedules which in turn adds cost to the operating utility.

Accordingly, a new access hatch seal is desired that will withstand the harsh operating environment of the steam generator while enabling ready access during maintenance operations.

Additionally, such an improved hatch seal is desired that is substantially self-contained and will not create any loose parts in the generator that might otherwise damage the U-shaped tubes.

SUMMARY OF THE INVENTION

This invention achieves the foregoing objectives by providing a mechanical locking mechanism for a removable access plate or hatch for a generally horizontal deck plate of the steam generator. The locking mechanism includes a pin holder attached to either one of the underside of a deck plate or a removable access plate. An elongated mechanical pin is retractably attached to a pin holder for moving in a generally horizontal plane under the deck plate under surface between a closed position and an open position. A receiving socket is attached to the other of the deck plate under surface or the removable access plate for engaging the mechanical pin in its closed position and, thus, locking the removable access plate to the deck plate.

In one preferred embodiment, the pin holder is attached to the removable access plate so that if service of the locking mechanism is required, the removable access plate can be easily removed from the steam generator to service the moving parts of the locking mechanism in a less caustic environment.

Furthermore, in another preferred embodiment, means are provided for locking the mechanical pin when the mechanical pin is in its closed position. Desirably, the means for locking the mechanical pin includes a lock nut that engages conical threads on the mechanical pin and locks the mechanical pin in a closed position. Desirably, the pin holder has a slot with opposing, parallel, vertical walls through which the mechanical pin slides between its closed and open positions. Desirably, the mechanical pin has longitudinally extending, diametrically opposing, relatively flat lands that are closely received within the opposing vertical slotted walls, so that the pin cannot rotate in the slot as it slides between its open position and its closed position or when the lock nut is tightened.

In still another embodiment, the means for locking the mechanical pin includes a movable cleat that is supported from the pin holder in line with a transverse slot in the mechanical pin. The cleat is movable into the slot when the mechanical pin in is the closed position to lock the mechanical pin. Preferably, the slot is in the surface of the mechanical pin and oriented in the vertical direction so that the cleat can drop into the slot when the mechanical pin is in the closed position. Desirably, the cleat is supported from the mechanical pin holder above the mechanical pin so that it can drop into the slot under the force of gravity. In one preferred embodiment, the cleat at one end is hingedly attached to the pin holder. Preferably, the locking cleat forms a backup locking mechanism to the lock nut for locking the mechanical pin in its closed position.

In still another preferred embodiment, the locking mechanism includes a reaction mount attached to the one of the deck plate under surface or the removable plate that the pin holder is attached to. The reaction mount is spaced from the pin holder between the pin holder and the receiving socket and has an opening in line with an engagement opening in the receiving socket. The mechanical pin, in its closed position, extends between and into the slots in the pin holder, the opening in the reaction mount and the opening in the receiving socket. Desirably, the mechanical pin further includes a circumferential retainer collar that abuts the lock nut to prevent lateral movement of the pin out of the pin holder.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
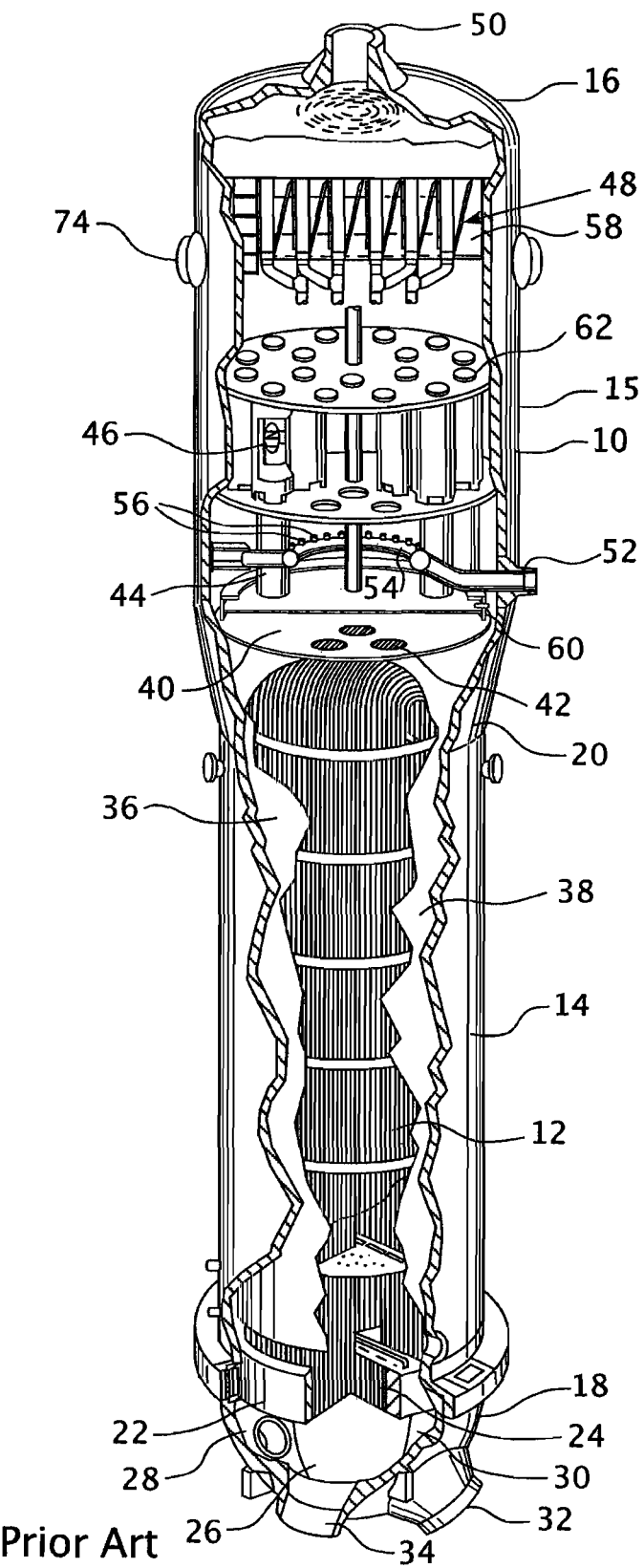
FIG. 1 is a perspective view, partially cut away, of a vertical steam generator.

Referring now to the drawings, FIG. 1 shows a steam or vapor generator 10 that utilizes a plurality of U-shaped tubes which form a tube bundle 12 to provide the heating surface required to transfer heat from a primary fluid to vaporize or boil a secondary fluid. The steam generator 10 comprises a vessel having a vertically oriented tubular lower shell portion 14 and a top enclosure or dished head 16, enclosing the upper end and a generally hemispherical shaped channel head 18 enclosing the lower end. The lower shell portion 14 is smaller in diameter than the upper shell portion 15 and a frustoconical-shaped transition 20 connects the upper and lower portions. A tube sheet 22 is attached to the channel head 18 and has a plurality of holes 24 disposed therein to receive ends of the U-shaped tubes. A divider plate 26 is centrally disposed within the channel head 18 to divide the channel head 18 into two compartments 28 and 30, which serve as headers for the tube bundle. Compartment 30 is the primary fluid inlet compartment and has a primary fluid inlet nozzle 32 in fluid communication therewith. Compartment 28 is the primary fluid outlet compartment and has a primary fluid outlet nozzle 34 in fluid communication therewith. Thus, primary fluid, i.e., the reactor coolant, which enters fluid compartment 30 is caused to flow through the tube bundle 12 and out through outlet nozzle 34.

The tube bundle 12 is encircled by a wrapper 36, which forms an annular passage between the wrapper 36 and the lower shell 14 and frustoconical transition cone 20. The top of the wrapper 36 is covered by a lower deck plate 40 which includes a plurality of openings 42 in fluid communication with a plurality of riser tubes 44. Swirl vanes 46 are disposed within the riser tubes to cause steam flowing therethrough to spin and centrifugally remove some of the moisture entrained within the steam as it flows through this primary centrifugal separator. The water separated from the steam in this primary separator is returned to the water pool 80 (see FIG. 2) above the lower deck plate. After flowing through the primary centrifugal separator, the steam passes through a secondary separator 48 before reaching a steam outlet nozzle 50 centrally disposed in the dished head 16.

The feedwater inlet structure of this generator includes a feedwater inlet nozzle 52 having a generally horizontal portion called a feedring 54 and discharge nozzles 56 elevated above the feedring 54. Feedwater, which is supplied through the feedwater inlet nozzle 52, passes through the feedring 54, and exits through discharge nozzle 56 and mixes with water which was separated from the steam and is being re-circulated. The mixture then flows down over the lower deck plate 40 and into the annular passage 38. The water then enters the tube bundle at the lower portion of the wrapper 36 and flows among and up the tube bundle where it is heated to generate steam.

Figure 2:
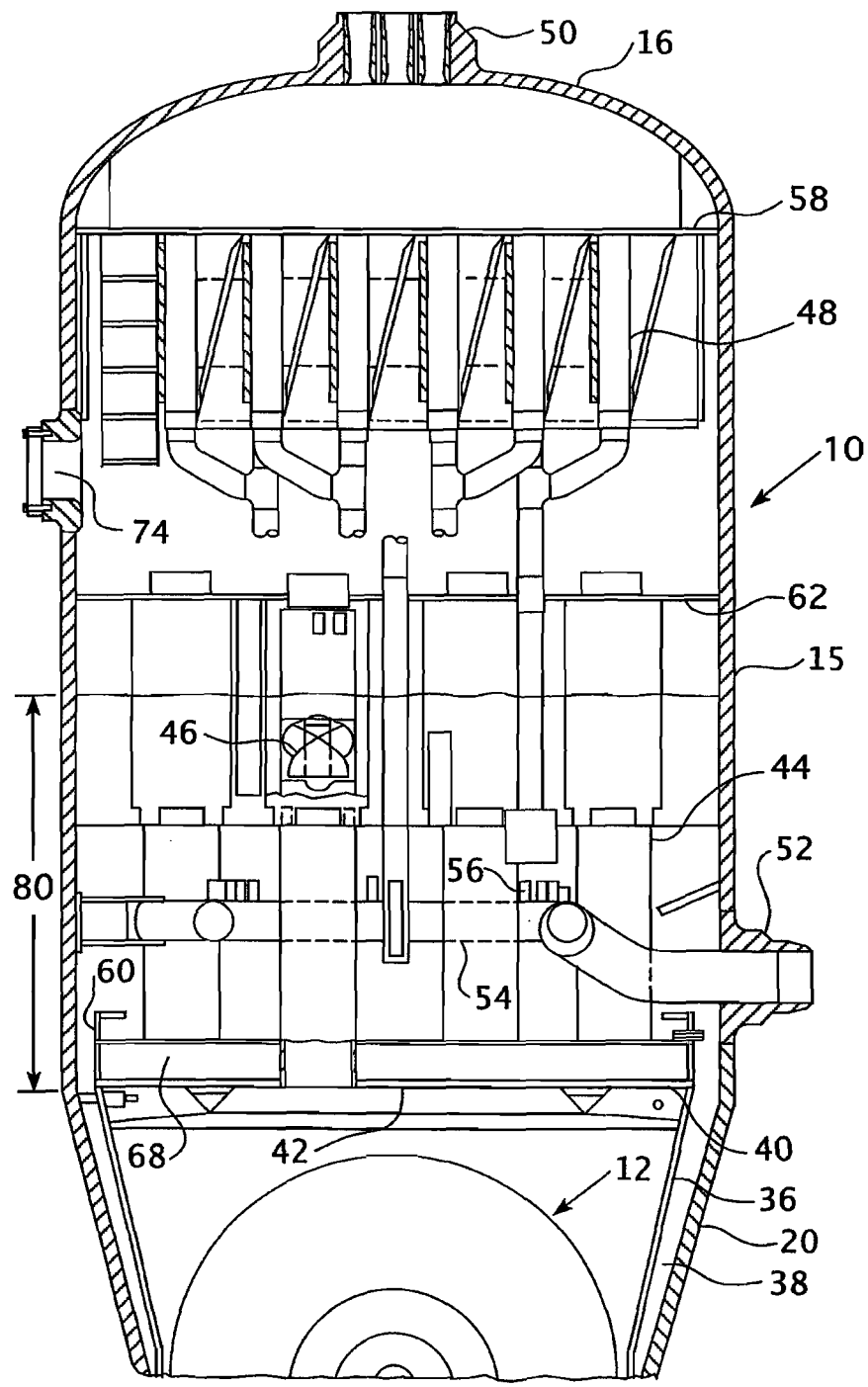
FIG. 2 is a cross-section of the upper portion of the vertical steam generator illustrated in FIG. 1.

FIG. 2 is a cross-sectional view of the upper portion of the steam generator shown in FIG. 1. The same reference characters are employed to designate the corresponding components in the several figures. The generator illustrated in FIGS. 1 and 2 includes a loose parts collector weir 60 and sludge collectors 68 more fully described in U.S. patent application Ser. No. 12/035,722, filed Feb. 22, 2008. The loose parts collector weir 60 and the sludge collectors 68 are formed as part of the lower deck plate 40 and collect sludge and loose parts that may have been entrained in the feedwater or recirculation stream and captures the same before they damage the tube bundle 12 or impede the efficiency of the generator. The sludge and loose parts are periodically removed during maintenance outages.

Access is provided to the steam generator 10 for maintenance through manways 74 between the intermediate deck plate 62 and the upper deck plate 58. The upper deck plate 58 supports the secondary separators 48. The upper deck plate 58 has a removable access plate 64, the underside of which can best be seen in FIG. 4 and is shown with a handle 66 to facilitate handling.

Figure 3:
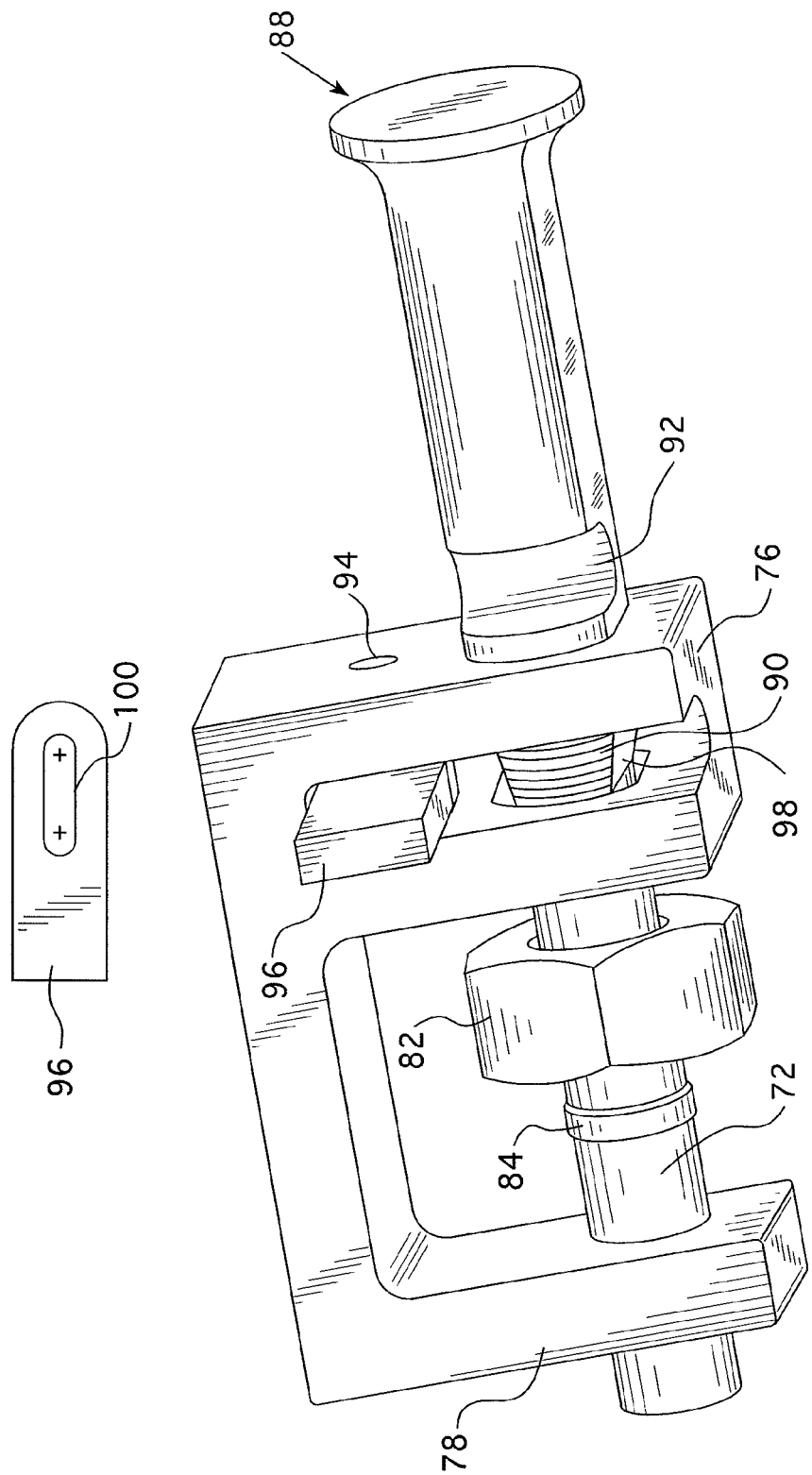
FIG. 3 is a perspective view of the locking mechanism of this invention.
Figure 4:
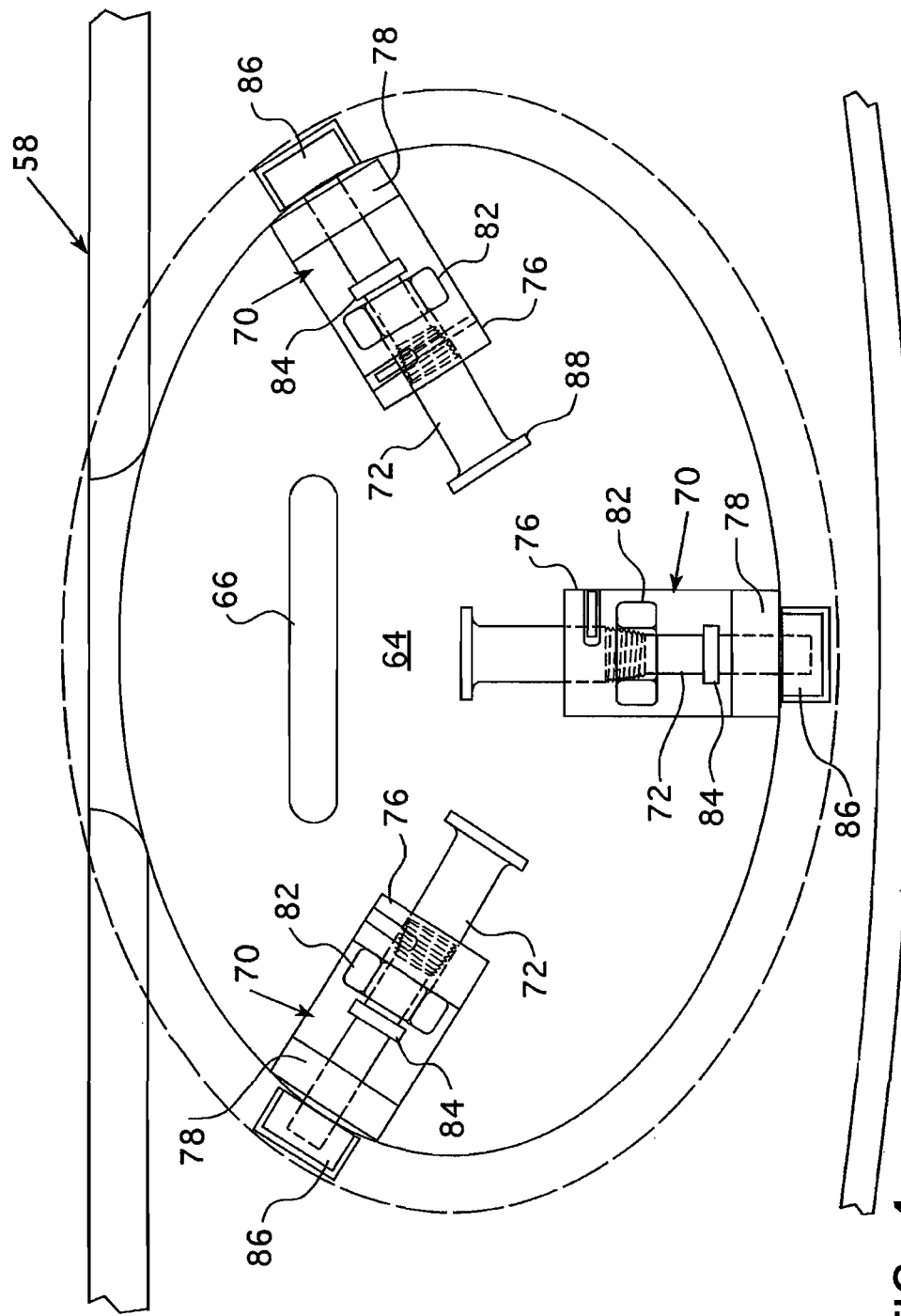
FIG. 4 is a planned view of the underside of a deck plate with the removable access plate in position partially locked by the locking mechanism of this invention.

FIG. 4 shows the underside of the upper deck plate 58 with the removable access plate 64 held in place by the mechanical locking system 70 of this invention. The mechanical locking system 70 of this invention, which will be described in more detail with respect to FIG. 3, basically includes an elongated mechanical pin 72 retractably attached to a pin holder 76. The mechanical pin 72 extends radially from the pin holder 76 through a reaction mount 78, and in its closed position is captured by a receiving socket 86 and locked in the closed position by a locking nut 82. Three such locking systems 70 are shown in FIG. 4, though it should be appreciated that between 2 and 4 such systems may be used with preferably at least three such systems employed to lock the access plate 64 in position against the upper deck plate 58.

As can be seen in FIG. 4, the assembly of the reaction mount 78, mechanical pin 72, lock nut 82, and pin holder 76 may be welded to either the removable access plate 64 or the undersurface of the upper deck plate 58, with the receiving socket 86 welded to the other of the removable access plate 64 or the underside of the upper deck plate 58. Preferably, the assembly of the reaction mount 78, mechanical pin 72, lock nut 82 and pin holder 76 is welded to the removable access plate so that the initial attachment, and any future service that may be required can be performed outside the generator by removal of the removable access plate 64. This allows maintenance work to be performed in a less caustic environment. A receiving socket 86 may be formed from a block of metal with a recess or hole machined to receive the outwardly radially extending end of the mechanical pin 72. Alternately, a welded pad can be employed with a similar recess.

The assembly of the reaction mount 78, mechanical pin 72, lock nut 82 and pin holder 76 is more fully shown in a perspective view illustrated in FIG. 3. FIG. 3 shows the mechanical pin 72 in the retracted position. As shown in FIG. 4, the pin holder 76 and the reaction mount 78 are preferably welded to the removable hatch cover as a unit, with the reaction mount 78 adjacent to the receiving socket 86. By assembling the mechanical pin 72 into the reaction mount 78 and the pin holder 76 and attaching retainer collar 84, the mechanical pin 72 and NPT locking nut 82 on the mechanical pin 72 are fully retained to the access plate 64. To engage the mechanical pin 72, the radially inwardly extending free end of the mechanical pin 72 is pushed manually radially outward using the finger grip 88 so that it engages the hole in the receiving socket 86. Preferably, the hole within the pin holder 76 from which the mechanical pin 72 extends, has at least a portion of it diametrically opposed sides slotted, i.e., extending in a straight line horizontally. The slotted side portions closely mate with machined lands 98 that extend longitudinally on either side of the mechanical pin 72, so that when the locking nut is moved into position to start to turn on the NPT (tapered) threads 90, the slotted portion of the walls on the pin holder 76 from which the mechanical pin 72 extends, prevents the pin from rotating. This requires that a portion of NPT threads 90 be machined away to form the lands 98 on diametrically opposite sides of the mechanical pin 72, however, that does not adversely affect the working of the threads 90 or the locking nut 82. After the locking nut 82 is engaged onto the mechanical pin 72, the bearing of a nut 82 against the side of the pin holder 76 prevents the pin from retracting.

Desirably, a retainer shoulder or collar 84 is provided on the mechanical pin body 72, to bear against the lock nut 82 and limit lateral motion of the pin 72 thereby retaining the lock nut 82.

In one preferred embodiment, a redundant locking feature is also provided to ensure that, in the unlikely event that the locking nut 82 were to back out of its locked position, the pin would still be retained in the locked position. A pin latch or cleat 96 is hingedly secured to the pin holder 76 by a latch hinge pin 94. The latch hinge pin 94 is securely press fit, welded, secured by upsetting the edges of the hole or otherwise firmly restrained in a hole within the pin holder 76. A latch slot 92 is machined in the surface of the pin and extends vertically and is sized to receive the latch as it rotates downward. Sufficient clearance is provided between the latch 96 and the opening in the pin holder 76 through which the mechanical pin 72 extends, so that the latch moves freely. When the mechanical pin 72 is in the closed position, the slot 92 aligns with the pin latch 96 so that when the pin latch 96 rotates around the latch hinge pin 94 it seats in the latch slot 92 preventing lateral movement of the mechanical pin 72. When the mechanical pin 72 is engaged, the pin latch 96 swings down by gravity into the latch slot 92 in the radially inward end of the mechanical pin 72. A slot 100 in the pin latch 96 allows the pin latch to be stored in a retracted position without the need to manually hold the pin latch, so that the installer may freely operate the pin.

Accordingly, all movable parts that are not directly welded to either the removable hatch cover plate or the underside of the deck plate, are fully retained; the NPT thread secures the pin in the locked position; a redundant locking tab secures the mechanical locking pin from axial movement in the unlikely event that the NPT locking nut 82 backs off the threads; only standard tooling i.e., a wrench, is required to operate the locking mechanism; most of the work to install the locking mechanisms can be performed outside of the steam generator unit; and repairs if needed to the locking mechanisms can be done by removing the hatch cover to the outside of the generator.

While specific embodiments of the invention have been described in detail in an application to a steam generator intermediate deck plate access opening, it will be appreciated by those skilled in the art that various modifications and alternatives to those details could be developed in light of the overall teachings of the disclosure. For example, the invention could be used for sealing access opening covers on any of the other steam generator deck plates. Accordingly, the embodiments disclosed are meant to be illustrative only and not limiting as to the scope of the invention, which is to be given the full breath of the appended claims and any and all equivalence thereof.

What is claimed is:

1. A pressurized water reactor nuclear steam supply system steam generator pressure vessel having a secondary side for separating steam from condensate comprising:
   a generally horizontal deck plate within the secondary side of the pressure vessel defining an access opening extending between an upper surface of the deck plate and an undersurface;
   a removable plate for covering the access opening;
   a pin holder attached to either one of the deck plate or the removable plate;
   an elongated mechanical pin retractably attached to the pin holder for moving in a generally horizontal plane between a closed position and an open position;
   a receiving socket attached to the other one of the deck plate or the removable plate for engaging the mechanical pin in its closed position;
   a locking mechanism for securely locking the pin when the pin is in the closed position, throughout steam generator operation, the locking mechanism including a lock nut; and
   wherein the pin has a first peripheral end that engages the receiving socket and a second peripheral end wherein at least a portion of a surface of the pin between the first peripheral end and the second peripheral end is threaded to engage the lock nut.

2. The pressure vessel of claim 1 wherein the pin holder has a slot with opposing, parallel wall portions through which the pin slides, the pin having longitudinally extending, diametrically opposing, relatively flat lands, along a length of the pin that is threaded to engage the lock nut, that are closely received within the opposing wall portions so that the pin can not rotate in the slot.

3. The pressure vessel of claim 1 wherein the thread is a conical thread.

4. The pressure vessel of claim 1 wherein the means for locking the pin includes a moveable cleat that is supported from the pin holder in-line with a transverse slot in the mechanical pin, the cleat being moveable into the slot when the mechanical pin is in its closed position to lock the mechanical pin.

5. The pressure vessel of claim 4 wherein the slot is in the surface of the mechanical pin and oriented in the vertical direction so that the cleat can drop into the slot when the mechanical pin is in its closed position.

6. The pressure vessel of claim 5 wherein the cleat is supported from the pin holder so it can drop into the slot under the force of gravity.

7. The pressure vessel of claim 6 wherein the cleat at one end is hingedly attached to the pin holder.

8. The pressure vessel of claim 1 wherein the means for locking the pin further includes a moveable cleat that is supported from the pin holder in-line with a transverse slot in the mechanical pin, the cleat being moveable into the slot when the mechanical pin is in its closed position to lock the mechanical pin.

9. The pressure vessel of claim 1 including a reaction mount attached to the one of the deck plate or the movable plate and spaced from the pin holder between the pin holder and the receiving socket, the reaction mount having an opening in-line with an engagement opening in the receiving socket, the pin in its closed position extending between and into a slot in the pin holder, the opening in the reaction mount and the opening in the receiving socket.

10. The pressure vessel of claim 9 wherein the mechanical pin includes a circumferential collar that retains the lock nut.

* * * * *